United States Patent [19]

Judd et al.

[11] Patent Number: 5,893,138
[45] Date of Patent: Apr. 6, 1999

[54] SYSTEM AND METHOD FOR IMPROVING CHANNEL HARDWARE PERFORMANCE FOR AN ARRAY CONTROLLER

[75] Inventors: Ian David Judd, Otterbourne, United Kingdom; Stephen G. Luning, San Jose, Calif.

[73] Assignee: International Business Machines Corporation, Armonk, N.Y.

[21] Appl. No.: 537,649

[22] Filed: Oct. 2, 1995

[51] Int. Cl.[6] .............................. G11B 17/22; G06F 13/12
[52] U.S. Cl. ..................... 711/114; 711/154; 395/182.04; 395/824
[58] Field of Search ................................... 395/438, 439, 395/441, 182.04, 182.07, 800, 822, 829, 823, 182.06, 824; 711/114, 112, 111, 154

[56] References Cited

U.S. PATENT DOCUMENTS

| | | | |
|---|---|---|---|
| 5,257,391 | 10/1993 | DuLac et al. | 395/830 |
| 5,287,462 | 2/1994 | Jibbe et al. | 395/856 |
| 5,345,565 | 9/1994 | Jibbe et al. | 395/310 |
| 5,410,536 | 4/1995 | Shah et al. | 370/216 |
| 5,465,251 | 11/1995 | Judd et al. | 370/351 |
| 5,469,548 | 11/1995 | Callison et al. | 711/114 |
| 5,471,640 | 11/1995 | McBride | 395/842 |
| 5,519,844 | 5/1996 | Stallmo | 711/114 |
| 5,526,507 | 6/1996 | Hill | 711/114 |
| 5,551,053 | 8/1996 | Nadolski et al. | 395/829 |
| 5,608,891 | 3/1997 | Mizuno et al. | 711/114 |
| 5,613,141 | 3/1997 | Szatkowski et al. | 395/822 |
| 5,664,221 | 9/1997 | Amberg et al. | 395/829 |

FOREIGN PATENT DOCUMENTS

| | | |
|---|---|---|
| 427119A2 | 2/1990 | European Pat. Off. . |
| 0 508 604 | 10/1992 | European Pat. Off. . |
| 508604A2 | 11/1992 | European Pat. Off. . |

OTHER PUBLICATIONS

G. Gibson et al., .A Case for Redundant Arrays of Inexpensive Disks (RAID)., ACM SIGMOD Conference, Chicago, IL., Jun. 1988, pp. 109–116.

Electronic Design, "4.3–Gbyte Hard–Disk Drive Employs SSA Interface", Sep. 5, 1995, vol. 43, No. 18, pp. 155–156.

*Primary Examiner*—Eddie P. Chan
*Assistant Examiner*—Hong C. Kim
*Attorney, Agent, or Firm*—Esther E. Klein; Noreen A. Krall

[57] ABSTRACT

Disclosed is an array controller for controlling the transfer of data from a host system to an array of data storage devices, comprising a processor connected via a local bus to a data buffer in which data is staged during said transfer. The array controller is provided with a buffer controller for controlling the operation of the buffer and is further provided with channel hardware for manifesting a plurality of data channels, selectable by the local bus address, over which data is transferred in and out of the data buffer.

12 Claims, 4 Drawing Sheets

SYSTEM AND METHOD FOR IMPROVING CHANNEL HARDWARE PERFORMANCE FOR AN ARRAY CONTROLLER

FIELD OF THE INVENTION

This invention relates to a controller for controlling the transfer of data between a host system and a plurality of data storage devices and also to a data processing system incorporating such a controller.

BACKGROUND OF THE INVENTION

Over recent years, there has been a growth in interest in disk drive arrays for storing large amounts of data in a computer system. A disk array typically consists of a number of disk drives connectable to a using system via one or more controller elements which control the transfer of data to and from the disk drives. A disk array is designed to provide high capacity data storage, high reliability and high data transfer rates to and from the using system.

One widely adopted scheme for array architectures is known as RAID (Redundant Arrays of Independent Disks). Details of RAID can be found in a number of publications including a paper entitled 'A Case for Redundant Arrays of Independent disks (RAID)' (ACM SIGMOD conference proceedings, Chicago, Ill., Jun. 1–3, 1988, pp.109–116). In this paper five levels of array (RAIDS 1 to 5) are proposed to provide different levels of data management. Each of the RAID levels permits users to increase their data storage capacity by linking together a number of inexpensive disk drives. The RAID system provides protection against loss of data through the failure of a drive by either storing two copies of the data on two drives (RAID 1) or by spreading the data across two or more drives of the array, calculating the parity for the striped data and storing the parity data on a different drive. In the event that one of the data holding drives fails, the data on the failed drive can be reconstructed using the parity data and the remaining data of the parity group (RAIDs 2 to 5). Arrays are often referred to as 'N+P' where there are N data disks and P parity disks. In RAID 3, for example, the data is bit or byte-striped across the disks with the parity data being stored on a single parity disk. For RAID 3 therefore, P is equal to one. A parity group consists of the group of data on the N disks and the parity data on the P disk.

When data is stored to disk in RAID 3, parity is generated by carrying out an XOR operation on the data being stored. The parity so generated is stored to a separate disk. A logical data record is broken up and interleaved across the disks with parity stored on a separate disk. All disks are accessed concurrently for a user application access. If data stored in the array is required to be updated, then the parity data for the parity group containing that data also needs to be updated. Parity generation may be implemented in software or alternatively in the form of XOR hardware. Hardware implementation generally allows for more rapid generation of parity as data is written from the host system to the array. One example of such an implementation is described in European patent EP 508 604.

SUMMARY OF THE INVENTION

It is an object of the present invention to provide an improved storage array controller and equally an improved data array incorporating such an array controller.

According to the invention, there is provided an array controller for controlling the transfer of data from a host system to an array of data storage devices, comprising a processor connected via a local bus to a data buffer in which data is staged during said transfer, said controller being provided with a buffer controller for controlling the operation of the buffer, the array controller further including channel hardware for manifesting a plurality of data channels, selectable by the local bus address, over which data is transferred in and out of the data buffer.

BRIEF DESCRIPTION OF THE DRAWINGS

For a fuller understanding of the nature and advantages of the present invention, as well as the preferred mode of use, reference should be made to the following detailed description read in conjunction with the accompanying drawings, in which.

DETAILED DESCRIPTION OF THE PREFERRED EMBODIMENT

Figure 1:
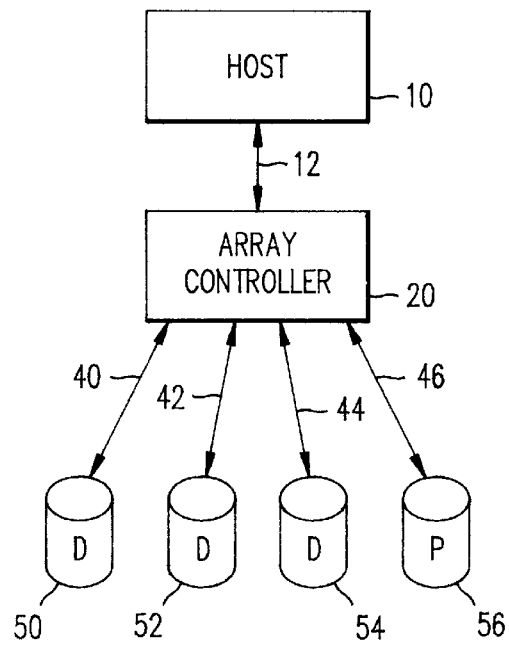
FIG. 1 is a block diagram of a data processing system comprising a host connected to an array of hard disk devices via a RAID controller.

With reference to FIG. 1, there is shown a data processing system comprising a host computer system 10 which is connected over a data bus or link 12 to a RAID controller 20 which is in turn connected via data links 40,42,44,46 to a plurality of data storage devices in the form of magnetic disk drives 50,52,54,56. Although in FIG. 1, each disk drive is shown connected to the RAID controller by a separate communication link, it will be appreciated that in an alternative configuration, the disk array may be configured as a loop wherein the disk drives are chained together, both ends of the chain being connected for communication to the controller. It will be appreciated that the number of disk drives in the array will depend on the particular application to which the data processing system is put. In the RAID 3 configuration, an array may consist of 3, 4 or more data drives along with one parity drive. Although the RAID controller is shown as separate from the host system, it will be appreciated that it is equally possible to include all RAID controller function within the host system e.g. in the form of an adapter card. The host system may be connected in turn to a second host system which is connected to its own RAID controller and array of disk drives. This host to host communication path provides a certain amount of redundancy in the case of failure of one of the RAID controllers.

In the preferred embodiment, the host system is the IBM RISC System/6000 computer running the IBM AIX operating system. Further details of both RISC System/6000 computers and the AIX operating system are readily obtainable in published documents. Connectivity between the host and the RAID controller and the disk drives may be implemented in a number of different ways depending on the required bandwidth and availability. The preferred embodiment however is described with reference to the Serial Storage Architecture (SSA) architecture. The SSA architecture is under development by the American National Standards Institute (ANSI) X3T10.1 and is an interface designed to connect external attachment devices such as disk drives, tape drives etc to workstation servers (host systems) and storage subsystems. Detailed information on SSA is obtainable from ANSI.

In accordance with the SSA architecture, the link between the host system and RAID controller is a serial link providing a communication path for serialised data. Full duplex communication over the link is provided by SSA to allow rapid transmission of data between the various components of the system. In a loop configuration, the two communication paths to each drive (i.e communication from both ends of the chain) can be used to double the bandwidth to each drive in the loop or to provide an alternate route to a drive when a connection has failed. SSA provides a two signal connection (transmit and receive) providing full duplex communication. The serial connection between the host system and the RAID controller consists of four wires used to communicate frames of information. The four lines consist of a plus/minus line out (transmit) and a plus/minus line in (receive). A port (referred to as a 'gateway') consists of hardware and firmware to support one end of a link (one transmit path and one receive path). A port in SSA is capable of maintaining two 20 megabyte per second conversations at any one time, one inbound and one outbound. An SSA dual port node is therefore capable of carrying on four simultaneous conversations for a total of 80 megabytes per second. A port in one node connects to a port in another node via a link. A gateway is established between two nodes to provide full duplex communication over the SSA network. A node issues a transaction to another node to perform a function such as accessing disks. The gateway consists of two connections, one in each direction—the master (the connection issuing the transaction) builds a master control block and the slave side of the gateway receives the transaction frames and builds a task control block which calls the addressed service.

SSA uses the logical aspects of the SCSI (Small Computer System Interface) specifications for addressing the serially attached disk drives. These SCSI specifications are mapped to the physical specifications of SSA. That is, SSA can be used as a transport layer for various upper layer protocols, in particular SCSI-2 for storage devices. SCSI-2 on SSA maintains a similar address scheme as defined in the SCSI-2 standard where there are initiators, targets and logical units.

Figure 2:
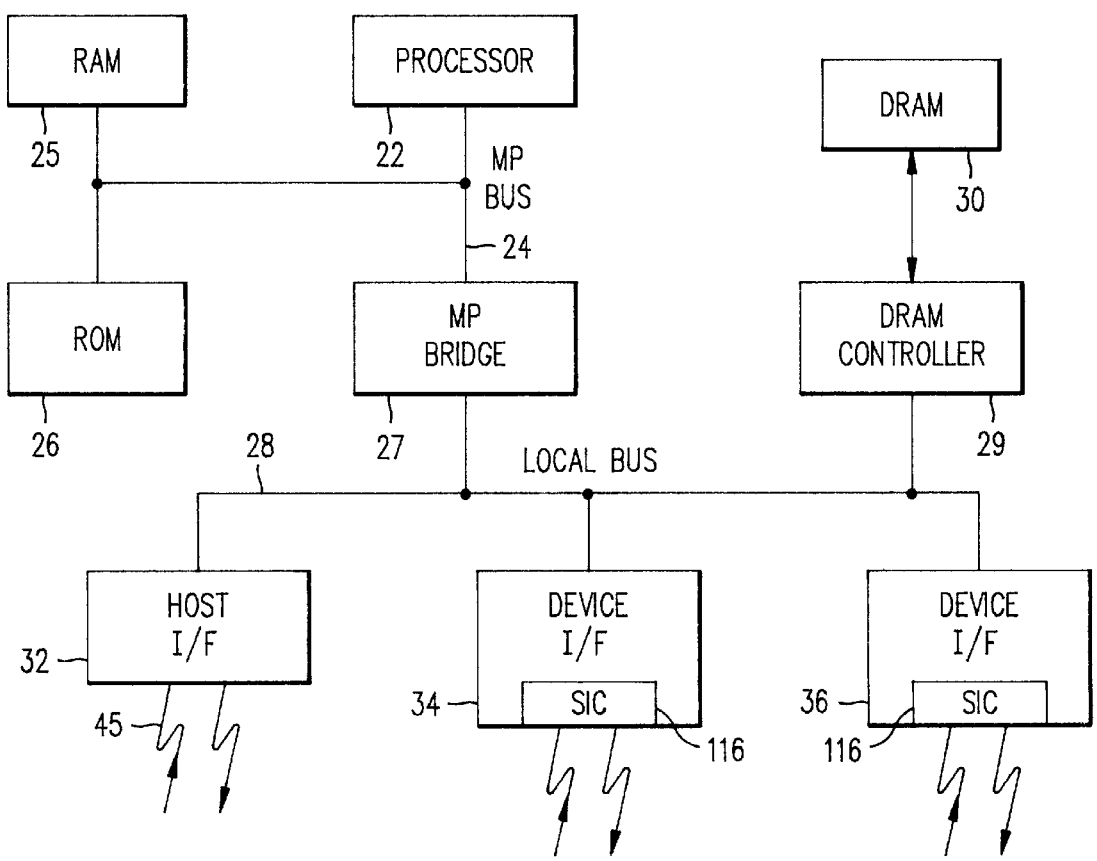
FIG. 2 is a block diagram showing the main logical components of the RAID controller of FIG. 1.

The main components of the RAID controller are shown in FIG. 2. The controller includes a microprocessor 22 connected over a microprocessor bus 24 to a RAM 25, which contains code and control blocks, and to ROM 26. A microprocessor bridge 27 connects the microprocessor 22 over a local bus 28 to DRAM controller 29 which is in turn connected to DRAM 30. DRAM controller includes the necessary hardware to provide flow-through XOR for a RAID 3 array. A host bridge 32 provides connection to the host system hardware through a PCI bus 45. Also connected on the local bus 28 are two SSA dual port chips 34 and 36 which provides communication paths to the array of disk storage devices.

Figure 3:
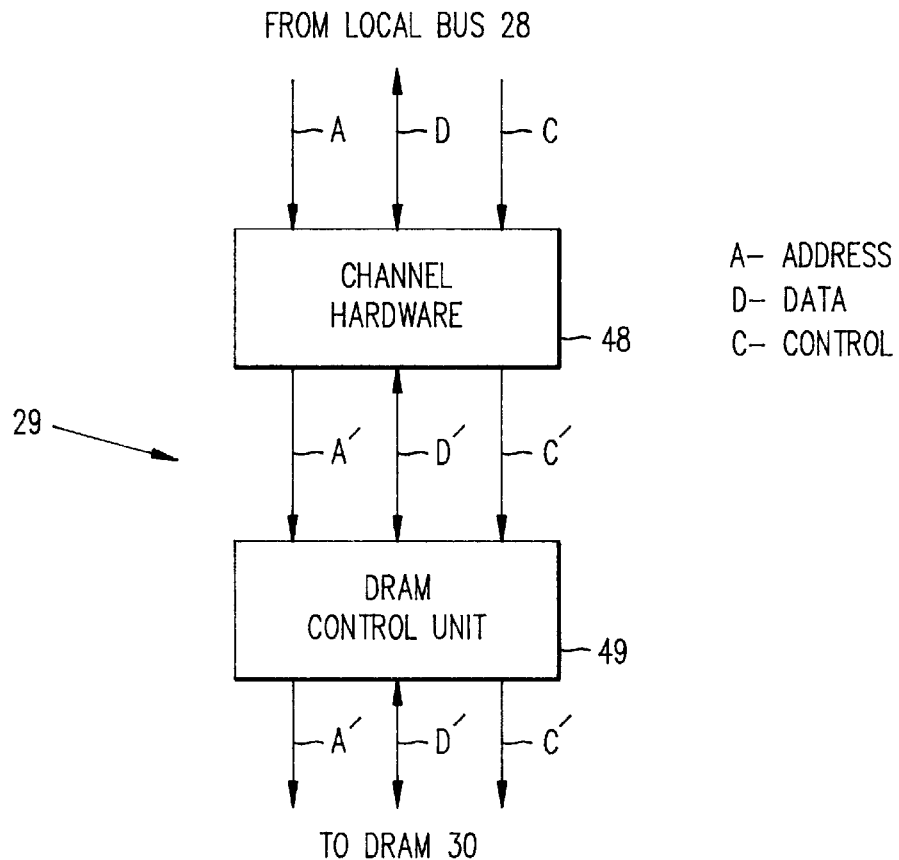
FIG. 3 is a block diagram showing the relationship of the channel hardware and DRAM Controller hardware in the RAID controller of FIG. 1.
Figure 6:
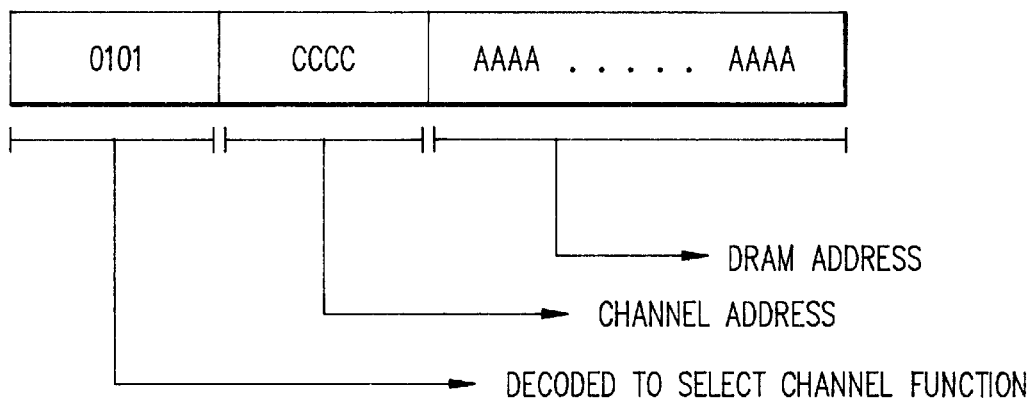
FIG. 6 is a diagram of a local bus address.

With reference to FIG. 3, there is shown Channel hardware 48 provided between the local bus 28 and a DRAM control unit 49 provide address transformations and/or data manipulation as data is accessed sequentially in the DRAM 30. The DRAM controller operates in a conventional manner to access data in DRAM. It multiplexes the row/column address and generates the DRAM control signals. Page-mode cycles are used to maximise the bandwidth during burst transfers. The channel hardware operates as a slave on the local bus, like a normal DRAM controller and the operation of the Channel hardware is transparent to a Master which is transferring data via a Channel. Multiple channels are advantageously provided to allow concurrent data transfers. A particular channel is selected by the high order bits of the input address. For example, with 16 channels, the local bus address includes bits to select the channel function and four bits to address a particular channel. The format of the local bus address used in this embodiment of the present invention is shown in FIG. 6. Each channel has a Function field and associated parameters which are stored in a Channel RAM within the channel hardware and which are initialised by firmware before the Channel is used in a data transfer. In the embodiment described herein, the channel hardware provides 16 Channels to manage data transfer between the local bus and DRAM. The channels are numbered 0, 1 . . . 15. A channel is selected by bits 31:24 of the local bus address as follows:

| Bits 31:24 | Function |
|---|---|
| 0100xxxx | Direct access to DRAM |
| 0101cccc | Access to DRAM via Channel 'cccc'. |

For example, Channel 7 is selected when bits 27:24 are '0111'b.

Figure 5:
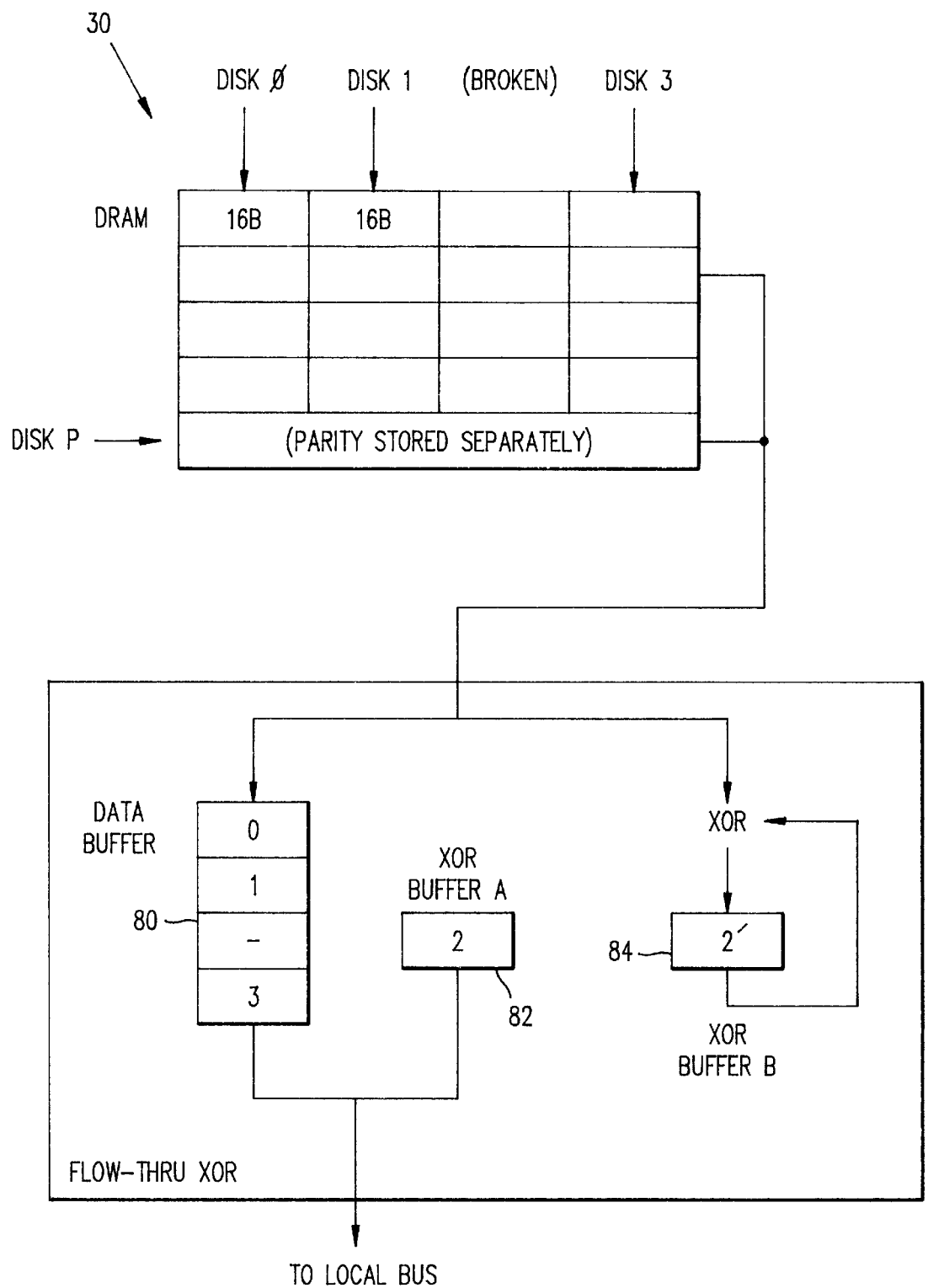
FIG. 5 is a block diagram of the DRAM and flow-through XOR hardware in the RAID controller.

In the present embodiment, as will be described below, RAID 3 STRIPE and WRITE operations may use any channel. However RAID 3 RECONSTRUCT operations may use Channel 15 only. Furthermore, the channels are designed to operate concurrently, subject to conflicts for the use of the Data and Parity buffers in the controller hardware. As examples:

All 16 channels can perform striping and/or RAID 3 write functions concurrently; up to 8 channels can perform RAID 3 write functions concurrently provided that a channel 'n' is not used at the same time as channel 'n+8' (when both are used for RAID-3 WRITE); Channel 15 can be used for RAID 3 RECONSTRUCT while any other channel is used for striping. The following buffer RAMS are required in the controller. (FIG. 5 refers)

One data buffer, consisting of 32 word×36 bit dual port RAM —the data buffer is used for RAID-3 reconstruct and RAID-3 WRITE.

Two Parity buffers, each consisting of a 4 word×36 bit dual port RAM—used only for RAID-3 reconstruct.

The Data and Parity buffers are addressed by the BufPtr field in the selected Channel.

These Channels are employed to perform defined array functions. These functions and the use of the Channel hardware will next be described with reference to an array configured as RAID 3. In such a configuration, the functions can be can be categorised as follows:

1. RAID-3 STRIPE:—this operation encompasses both the striping of data from Devices to DRAM and from DRAM to Devices. One channel is employed for each device.

2. RAID-3 WRITE:—this operation encompasses the transfer of data from Host to DRAM. In this embodiment, this operation involves on-the-fly generation of parity data as the data is transferred into DRAM. A single channel is employed for this type of transfer. Note that this function is used for all transfers from HOST to DRAM even when a disk is broken; in which case the data for that disk is simply not used.

3. RAID-3 RECONSTRUCT:—this operation covers the transfer of data from DRAM to Host and takes effect when one of the data storage devices is out of action. In this embodiment, the missing data is reconstructed on-the-fly as data is transferred out of DRAM. A single channel is employed for this type of transfer.

First will be described the set-up and operation of the system in carrying out a write of data from host memory to the devices configured as a RAID-3 array.

Figure 4:
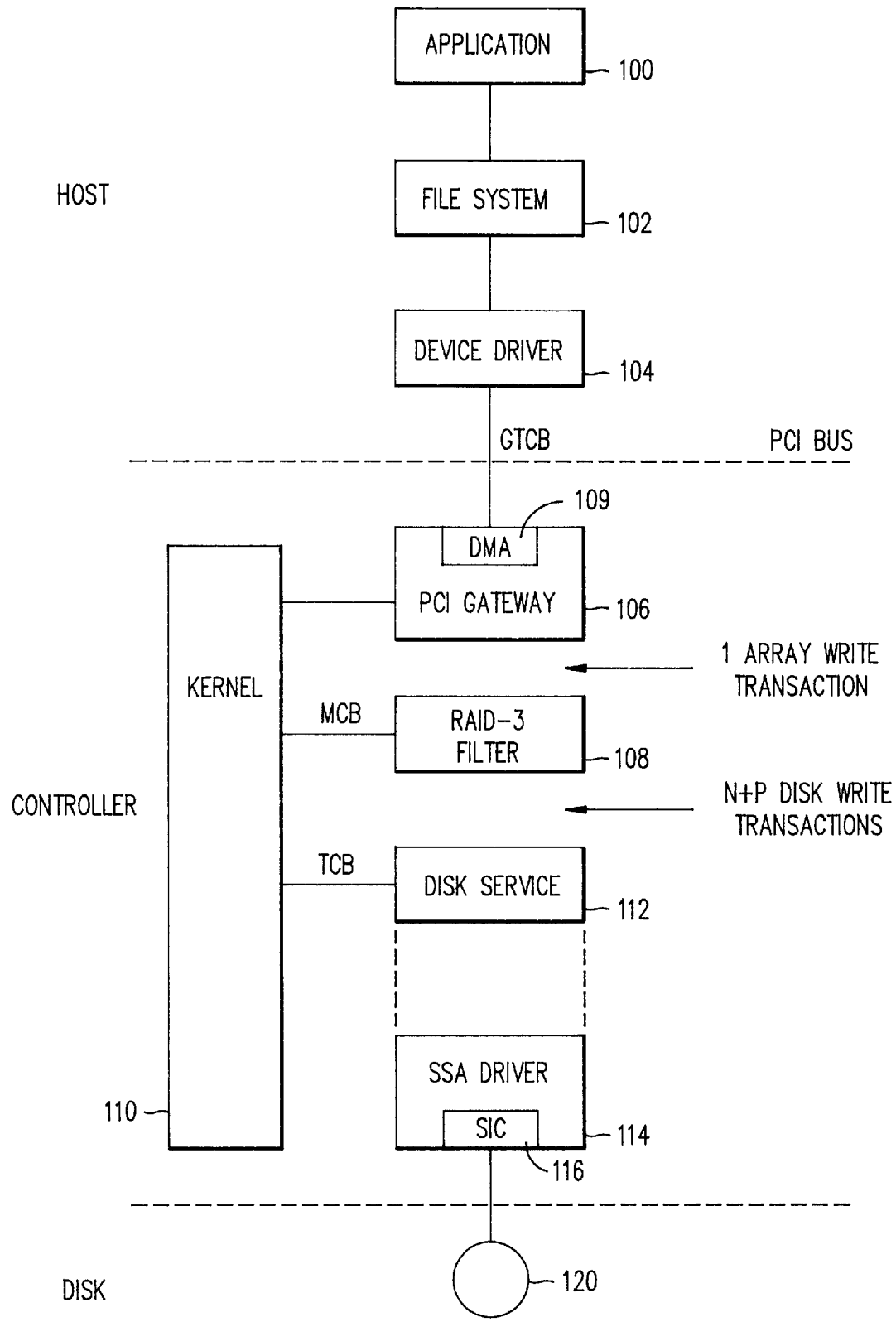
FIG. 4 is a block diagram showing the services provided by the data processing systems to effect RAID operations according to the present invention.

When an application running on the host requests the write of data onto the storage devices, it is first necessary to set up the controller hardware and firmware to carry out a RAID-3 WRITE in order to write data into the controller DRAM buffer and also to set up the controller hardware and firmware to carry out a RAID-3 STRIPE in order to transfer the data from DRAM buffer to the individual disk storage devices. To simplify the following discussion, the two operations of RAID-3 WRITE and RAID-3 STRIPE will be described as if they take place consecutively. However, it will be understood that in order to provide efficient pipelining of data between host memory and devices, the two operations RAID-3 WRITE and RAID-3 STRIPE will generally be arranged to operate in parallel. As will be described in greater detail below, A/B buffering is provided in the controller to allow for writing to disk device on receipt of a specified amount of data from the host. RAID-3 WRITE and STRIPE operations will now be described with reference to FIG. 4.

RAID-3 WRITE

RAID-3 WRITE is initiated by an application 100 running on the host requesting write of data to storage. The application passes details of the data to be transferred, including its address in host memory, to a file system 102 associated with the host system which translates this request into a physical request including details of the disk number, the start Logical Block Address and the number of blocks of data to be written. A master process of the Device Driver 104 when presented with this request generates and issues a transaction to the controller. This master process calls the host kernel with a pointer to a Master Control Block (MCB) for the Transaction. The MCB is addressed to required service in the controller. In the present case, the required service is RAID-3. The host kernel calls the Gateway with a pointer to the MCB. The host side of the Gateway creates a Gateway Transaction Control Block (GTCB), for the write operation in host memory. The GTCB specifies a number of parameters, including for the purposes of the present discussion: (i) Destination Service—which is the RAID-3 service provided by the controller firmware; (ii) Pointer to write data in host memory; and (iii) pointer to details of actual operation parameters.

The PCI Gateway writes a pointer to the GTCB into a queue in memory. Host hardware raises an interrupt to the controller when the host writes the GTCB pointer. The controller side of the Gateway 106 employs the host interface chip to fetch the GTCB by DMA 109. The Gateway then creates a Transaction Control Block (TCB) in the controller address space. Finally the Gateway calls the controller kernel 110 to submit the TCB. The controller kernel calls the RAID-3 service 108 with a pointer to the TCB. The RAID-3 service then creates Write transactions for each of the disk drives making up the RAID 3 array and sends these transactions to the Disk Service 112 using the kernel. The Disk Service generates the appropriate SSA-SCSI read commands and passes these to the SSA Driver 114 which includes the Serial Interface Chip 116.

The SSA driver issues the SCSI commands to the disk drives 120 using the SSA protocol and Serial Interface Chip. The SCSI command to each disk drives specifies the start LBA and number of blocks to be written.

In the controller, a memory allocation service allocates space in the DRAM buffer for the write data. The memory allocation service allocates and initialises one channel in the channel hardware for a RAID-3 WRITE. This initialisation comprises writing the following parameters into Channel RAM (in the present description 1 word is equal to 4 Bytes):

(i) Addr1—contains the DRAM word address;

(ii) InP—is a bit for specifying whether the parity is to be interleaved with the data (InP=1) or whether parity is to be written into a separate parity data area within the allocated buffer space (InP=0);

(iii) Fun—is a two bit field which is coded to select the channel function (for a RAID-3 WRITE this field is set to 10b);

(iv) Addr2 contains an additional DRAM word address (which specifies address in DRAM for parity when InP=0); and (v) ArrWid which specifies the width of the RAID 3 array. ArrWid is defined as equal to N−1, where N is the number of data disks (i.e. not including the parity disk).

The stripe size (i.e. the size of a unit of data as stored in DRAM for each disk—see FIG. 5 for example) is chosen as a compromise between minimising the amount of on-chip RAM in the controller and maximising the DRAM bandwidth when accessing the parity stripe. In the following discussion, the stripe size is set at 16 bytes.

Once the channel has been allocated, the DMA engine 108 in the host interface chip 32 is loaded with the source address in host (provided in the original I/O request), the destination address in DRAM and the byte count. The DMA engine then controls transfer of the data to DRAM by DMA. For the specified channel, RAID-3 WRITE uses one stripe of the data buffers to calculate the parity for each stripe. The data on the local bus is stored into DRAM linearly at the address Addr1. Concurrently with the storage of data in DRAM, XOR operations are performed on each stripe (i.e. 16 Bytes) of data. The stripe of data for the first disk is stored into the Data buffer stripe selected by bits 26:24 of the local bus address. The data stripes for the remaining disks are XOR'ed into the buffer. Once generated, the contents of the stripe buffer (i.e. the parity) is stored either linearly in a separate area of DRAM using Addr2, if InP=0 or as an additional data stripe if InP=1.

RAID-3 STRIPE

As has been already mentioned, RAID-3 STRIPE operations from DRAM to disks will generally operate in parallel with the RAID-3 WRITE operations between host and DRAM. A RAID-3 STRIPE operation proceeds as follows:

In response to a SCSI command issued over the serial link by the controller each disk drive returns a data request message when it is ready to receive data. On receipt of the data request message from each drive, the SSA driver sets up the SIC to transfer the data by DMA to DRAM over the local bus. For each disk drive the SSA driver dynamically allocates a SIC DMA channel and initialises the DMA channel with details of the local bus address (as provided in the original Write transactions issued by the RAID-3 service), the total number of bytes to be transferred and the fact that the operation is a Write operation. Bits 31:24 of the local bus address specify the identity of the controller Channel and the fact that the transfer is to be via DRAM.

One controller Channel is allocated and initialised for each disk drive of the array. Controller firmware loads the Channel RAM for the specified channel for each disk of the array with the following parameters: InP, ArrWid and Addr1. (see above for a definition of these parameters). The striping is performed as the data is read or written over the local bus. For each disk, the channel hardware accesses the requested data from DRAM using the word address Addr1. Addr1 is normally incremented by 1 after each word is accessed. However at the end of the first stripe of data (i.e. 16 Bytes) for the respective disk, Addr1 is incremented by: 1+4*Arrwid, if InP=0 (parity data stored in separate area of DRAM during RAID-3 WRITE; or 1+4*(1+ArrWid), if InP=1. In this manner data is transferred to each disk by means of an allocated controller Channel.

Use of the channel hardware as part of a RAID-3 RECONSTRUCT operation will now be described. This operation is used to reconstruct the read data from a broken data disk during an array read command. The data flow of the reconstruct operation is shown in FIG. 5. During a RECONSTRUCT operation, the data from the operational disks is striped into DRAM using any available channels in a manner as described above (except of course that data is transferred into DRAM rather than out of DRAM). If non-interleaved parity is chosen (InP=0), then the stripes for the broken disk are left empty and the read data from the parity disk is stored linearly in a separate area of DRAM using Addr2. However if the interleaved parity mode is chosen (InP=1), the parity replaces the stripes for the broken disk (Addr2 is not used). RAID-3 reconstruct uses the A/B Data and Parity buffers and Channel 15. Firmware initialises the Channel RAM for channel 15 with the following parameters: InP, ArrWid, Addr1, Addr2 and BufPtr. The identity of the broken disk is stored in a Reconstruct register which controls the RAID-3 reconstruct function.

The flow-through XOR processes one stripe from each disk as follows:

1. The data requested by the host bridge is normally transferred to the local bus from the Data buffer 80, incrementing the buffer pointer (BufPtr) after each word. However when the buffer pointer addresses the stripe corresponding to the broken disk (as identified in the Reconstruct register), the data is transferred from the current parity buffer (82 or 84) instead.

2. As each word is transferred over the local bus, the alternate data and parity buffers are filled with the next set of stripes from DRAM:

—the valid data stripes are fetched using Addr1 in Channel 15, Addr1 increments after each word.

—when the stripe allocated to the broken disk is reached, Addr1 continues incrementing and the parity stripe is fetched either from the address pointed by Addr2, if InP=0 (in which case Addr2 is incremented after each word of the parity stripe), or from the stripe location of the broken disk, if InP=1 (in which case Addr2 remains unaltered)

—each word fetched is stored in the Data buffer at BufPtr

—The first stripe is also stored in the parity buffer.

Subsequent stripes are XOR'ed into the Parity Buffer.

While the invention has been particularly shown and described with reference to the preferred embodiment, it will be understood that various changes of form and detail may be made without departing from the spirit and scope of the invention as defined by the appended claims.

We claim:

1. An array controller for controlling the transfer of data from a host system to an array of data storage devices comprising:

a processor connected via a local bus to a data buffer in which data is staged during said transfer;

a buffer controller controlling the operation of the data buffer; and channel hardware manifesting a plurality of data channels, selectable by a local bus address, over which data is transferred concurrently into and out of the data buffer to and from the local bus;

wherein the local bus includes an identification bit for specifying that the data is to be transferred by the data buffer and channel identification bits identifying the data channel to be selected for the data transfer and further wherein the local bus address specifies an array controller service to be performed on the data to be transferred on the selected channel.

2. The array controller as claimed in claim 1 further comprising means for providing a RAID-3 array controller service, selectable by the local address, whereby data is stored on the storage devices according to RAID-3.

3. The array controller as claimed in claim 2, wherein one of said RAID-3 services is a RAID-3 WRITE operation transferring data from the host to the data buffer, over a channel specified by the local bus address, for subsequent storage on data storage devices and generating the parity associated with the data for subsequent storage on a parity storage device.

4. The array controller as claimed in claim 3, wherein one of said RAID-3 services is a RAID-3 STRIPE operation for transferring data between the data storage and parity storage devices and the data buffer, one channel being selected for each storage device.

5. The array controller as claimed in claim 4, wherein one of said RAID-3 services is a RAID-3 RECONSTRUCT operation which reconstructs data on a failed storage device.

6. The array controller as claimed in claim 1, wherein the data buffer comprises Dynamic Random Access Memory (DRAM).

7. A data storage array in connection with a host computer system comprising a plurality of data storage devices configurable as an array and an array controller for controlling the transfer of data from the host system to an array of data storage devices, the array controller comprising:

a processor connected via a local bus to a data buffer in which data is staged during said transfer;

a buffer controller controlling the operation of the buffer and;

channel hardware providing a plurality of data channels, selectable by a local bus address, over which data is transferred in and out of the data buffer;

wherein the local bus address includes an identification bit for specifying that the data is to be transferred by the data buffer and channel identification bits identifying the data channel to be selected for a data transfer, and further wherein the local bus address specifies the array controller service to be performed on the data to be transferred on the selected channel.

8. The array as claimed in claim 7 further comprising means for providing a RAID-3 array controller service, selectable by the local address, whereby data is stored on the storage devices according to RAID-3.

9. The array as claimed in claim 8, wherein one of said RAID-3 services is a RAID-3 WRITE operation transferring data from the host to the data buffer, over a channel specified by the local bus address, for subsequent storage on data storage devices and generating the parity associated with the data for subsequent storage on a parity storage device.

10. The array as claimed in claim 9, wherein one of said RAID-3 services is a RAID-3 STRIPE operation for transferring data between the data storage and parity storage devices and the data buffer, one channel being selected for each storage device.

11. The array as claimed in claim 10, wherein one of said RAID-3 services is a RAID-3 RECONSTRUCT operation which reconstructs data on a failed storage device.

12. The array as claimed in claim 7, wherein the data buffer comprises Dynamic Random Access Memory (DRAM).

* * * * *